Nov. 21, 1944.   T. R. SCHREINER   2,363,366
WEIGHING AND HANDLING DEVICE
Filed Nov. 29, 1943
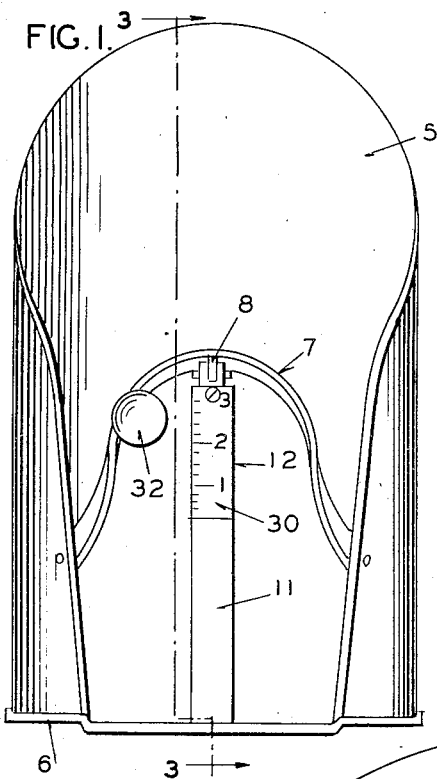
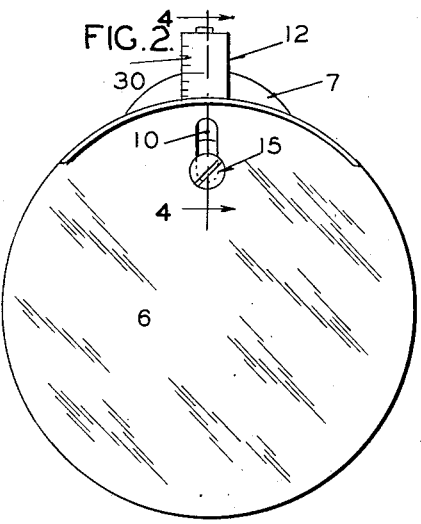
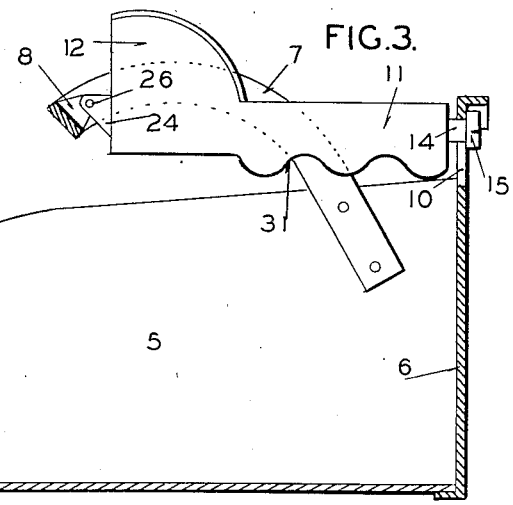
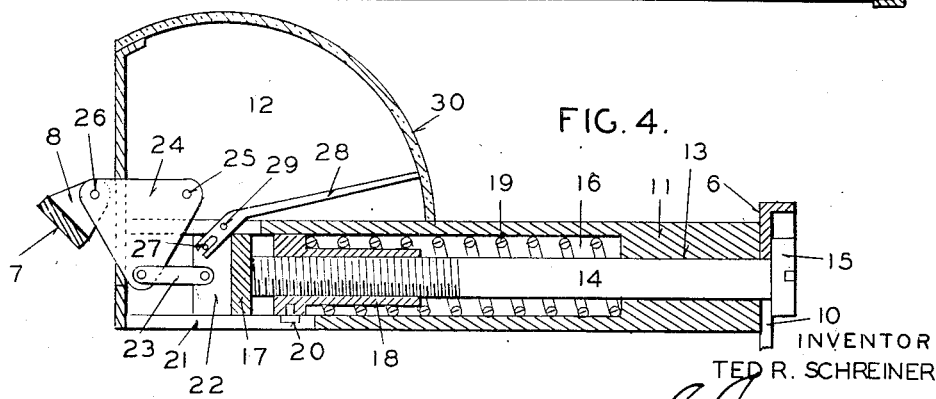
INVENTOR
TED R. SCHREINER
BY
ATTORNEY Patented Nov. 21, 1944

2,363,366

UNITED STATES PATENT OFFICE 2,363,366

WEIGHING AND HANDLING DEVICE

Ted R. Schreiner, Kirkwood, Mo.

Application November 29, 1943, Serial No. 512,092

4 Claims. (Cl. 265—66)

My invention relates to a weighing and handling device including a container for the material and a scale mechanism attached thereto and forming a manipulating handle therefor. In the specific form of device shown, the receptacle is in the form of a scoop but other forms of receptacles may be employed.

One of the objects of my invention is to provide a simple and convenient weighing and handling device in which the scale mechanism will provide the only means necessary for manipulating the receptacle both in the loading and weighing operations.

Another object of my invention is to improve the construction of the weighing mechanism itself, including simple and effective means for correcting the reading of the weight indicator.

In the accompanying drawing which illustrates one embodiment of my invention in the form of a scoop scale, Figure 1 is a side elevation showing the device in vertical position; Figure 2 is an end view; Figure 3 is a section taken on the line 3—3 of Figure 1; and Figure 4 is an enlarged section taken on the line 4—4 of Figure 2.

The scoop comprises a body portion 5 of approximately semi-cylindrical form having its open end rounded for insertion into the material to be weighed. The other end is closed by a circular end plate 6. Secured to the sides of the scoop body and extending upwardly therefrom when the device is in horizontal position is a U-shaped supporting strap 7 carrying at its center a lug 8. The strap is so located that this lug is located approximately at the center of the length of the scoop and is in longitudinal alignment with a vertical slot 10 formed in the end plate 6 adjacent the edge thereof.

The scale mechanism comprises a handle 11 and a casing 12. Extending through it is a bore 13 for the reception of a bolt 14 which projects through the slot 10 and is provided with a head 15. The bore 13 is provided with an enlarged portion 16 which forms a guide for a plunger 17 and a nut 18. It also encloses a spring 19 positioned between the nut and the end of the bore. The forward end of the bolt is threaded in the nut and bears against the plunger. The nut is prevented from rotation by cap screw 20 sliding in a slot 21. The plunger is provided with a transverse slot 22 in which is pivoted one end of a link 23, the other end of which is pivoted to a bell crank lever 24 pivoted to the casing at point 25 and to the lug 8 at point 26. The slot 22 also carries a pin 27 engaging the bifurcated end of a pointer 28 pivoted at point 29 to the casing. The casing is covered by a curved transparent plate 30 having its center of curvature at pivot point 29 so that when the pointer is pivoted about this point its end will travel around the inner face of the plate and be visible through it to indicate the weight on a scale indicated on its outer face. The handle should be of sufficient diameter to form a comfortable hand grip and while it may be made straight, as shown in Figure 4, I prefer to corrugate its under side as shown at 31 in Figure 3 to accommodate the fingers. For convenience in handling, it is also desirable to attach a thumb button 32 to the strap 7 at one or both sides of lug 8.

In the operation of the device it is grasped by the handle 11, the wrist being so flexed that bolt 14 will be moved into the outer end of slot 10 as shown in Figure 3. The scoop is now used in the ordinary way to take up material. In this position the weight of the scoop and contents will be largely carried by the outer end of the bolt so that the spring will not be brought into action to such an extent as to interfere with the manipulation of the scoop. When it is desired to ascertain the weight of material in the scoop, the wrist is flexed in order to incline the handle relatively to the scoop and thus move bolt 14 into the inner end of slot 10. This will transfer the entire weight of the scoop and contents through strap 7 to point 26 of the bell crank lever which will be swung on its pivot 25. This movement is transmitted through link 23 to the plunger which will be moved against the pressure of the spring an amount proportional to the weight, the result being indicated by the pointer on the scale carried by plate 30. It will be understood that the tension of the spring is adjusted by turning the bolt 14 by means of its head 15 until the weight of the scoop alone brings the pointer to zero. Such corrections may readily be made at any time if the weighing mechanism gets out of adjustment.

Having fully described my invention, what I claim as new and desire to secure by Letters Patent of the United States is:

1. In a device of the class described, the combination with a scoop which when in normal position has a generally horizontally extending body, of weighing mechanism comprising a handle having pivotal connection with said scoop, said connection being located above the central portion of the scoop and said handle also having a lost motion connection with the scoop, said lost motion connection permitting tilting of the handle relative to the scoop to a limited extent only but whereby the handle may be tilted from a position in which the weight of the scoop is partially supported by the weighing mechanism to a position in which the weight of the scoop is entirely supported by said mechanism.

2. In a device of the class described, the combination with a scoop which when in normal position has a generally horizontally extending body, a horizontally extending handle for the scoop, a bell crank lever pivotally mounted on the handle, one arm of said bell crank lever being pivotally attached to the scoop at a point located above the central portion thereof, load counterbalancing and indicating means supported by said handle and connected to the other arm of said bell crank lever, a pin and slot connection between the handle and the scoop permitting limited relative vertical movement whereby said handle may be tilted from a position in which the weight of the scoop is supported partially by the bell crank to a position in which the weight of the scoop is entirely supported by the bell crank.

3. In a device of the class described, the combination with a scoop which when in normal position has a generally horizontally extending body and a vertical end plate, a horizontally extending handle for the scoop, a bell crank lever pivotally mounted at one end of the handle, one arm of said bell crank lever being pivotally attached to the scoop at a point located above the central portion thereof, load counterbalancing and indicating means housed in said handle and connected to the other arm of said bell crank lever, a pin and slot connection between the other end of said handle and said end plate permitting limited vertical movement of said other end of the handle whereby said handle may be tilted from a position in which the weight of the scoop is supported partially by the bell crank to a position in which the weight of the scoop is entirely supported by the bell crank.

4. In a device of the class described, the combination with a scoop which when in normal position has a generally horizontally extending body and a substantially vertical end plate provided with a vertically extending slot, a horizontally extending handle for the scoop, a bell crank lever pivotally attached to the handle and to the scoop, said latter attachment being at a point above the central portion of the scoop, a slidable spring biased bolt extending through the handle and engaging with the slot in the end plate, means for transmitting pressure from the bell crank lever to the bolt, and means indicating the extent of motion of the bolt in spring compressing direction.

TED R. SCHREINER.